United States Patent
Espy et al.

[19]

[11] Patent Number: 6,128,750

[45] Date of Patent: *Oct. 3, 2000

[54] FAIL-OVER SWITCHING SYSTEM

[75] Inventors: James W. Espy, Andover; Scott Bleiweiss, Upton, both of Mass.; Robert C. Solomon, Kensington, N.H.; Brian K. Bailey, Shrewsbury; Peter Everdell, Littleton, both of Mass.

[73] Assignee: EMC Corporation, Hopkinton, Mass.

[*] Notice: This patent is subject to a terminal disclaimer.

[21] Appl. No.: 09/105,064

[22] Filed: Jun. 26, 1998

Related U.S. Application Data

[63] Continuation of application No. 08/749,311, Nov. 14, 1996, Pat. No. 5,922,077.

[51] Int. Cl.7 ..................................................... G06F 11/00

[52] U.S. Cl. ........................................ 714/7; 714/4; 714/9

[58] Field of Search ................................... 714/7, 4, 9, 3, 714/43; 370/217, 360; 340/827

[56] References Cited

U.S. PATENT DOCUMENTS

| | | | |
|---|---|---|---|
| 4,371,754 | 2/1983 | De et al. | 179/18 |
| 4,594,709 | 6/1986 | Yasue | 395/182 |
| 4,627,055 | 12/1986 | Mori et al. | 395/182 |

(List continued on next page.)

FOREIGN PATENT DOCUMENTS

| | | |
|---|---|---|
| 0751464A | 1/1997 | European Pat. Off. . |
| WO 91/13399 | 9/1991 | WIPO . |
| WO 97/07458 | 2/1997 | WIPO . |

OTHER PUBLICATIONS

"In–Depth Fibre Channel Arbitrated Loop", R. W. Kembel, *Northwest Learning Associates for Solution Technology.*
Ciprico Annual Report, 1995.
Ciprico Disk Arrays, Product Description, 1995.
CLARIION, Data General Corporation, Product Description, 1995.
"Disk Servers and RAID", A Comparative Overview from Computing Edge, Computing Edge Corporation, 1996.
"Tandem Expands Leading Fault–Tolerant Unix(r) Systems Offerings and Adds Complementary Servers and Workstations", Tandem Computers, Inc., Oct. 18, 1996. http://www.tandem.com/press–releases/integrity.html.
Integrity S4000 Servers: CO Models, Tandem Computers, Inc., Sep. 1995. http://www.tandem.com/INFOCTR/PROD_ DES/ITS4COPD/ITS4COPD.HTM.
Fibre Channel Association. http://www.Amdahl.com/ext/CARP/FCA/FCA.html.
"Channel Networking: Networking Flexibility with Channel Speeds Using . . . ", Fibre Channel. http://www.ancor.com/chnlet.htm.
"High Availability: Stayin' Alive—High availability storage clusters offer customers near fault tolerance and offer VARs better margins than RAID", Peter Jordan, Apr. 15, 1996, 1996 CMP Publications, Inc. http://192.216.191.76/cg . . . = 125596&CO_CD=4&CO_TXT=Y.
"Disk Array Reliability is Improving", Ann Miller, CMP Media, Inc., May 23, 1994. http://192.216.191.76/cg . . . = 125888&CO_CD=1&CO_TXT=Y.

(List continued on next page.)

*Primary Examiner*—Ly V. Hua
*Attorney, Agent, or Firm*—Bromberg & Sunstein LLP

[57] ABSTRACT

A recovery method for use in a data storage system in which a plurality of data storage devices are connected to each of two communication paths. A switch may route requests to either of the two communication paths. With one data storage controller in communication with the data storage devices over a first path and a second data storage controller in communication with the data storage devices over a second path, upon detection of a malfunction on the first path, a data storage controller may request access to the other path. Thereafter, the controller may be switched into connection with the remaining operable path so as to share that path with the other controller.

8 Claims, 3 Drawing Sheets

U.S. PATENT DOCUMENTS

| | | | |
|---|---|---|---|
| 4,958,273 | 9/1990 | Anderson et al. | 395/812 |
| 4,991,174 | 2/1991 | Mori et al. | 714/10 |
| 4,993,015 | 2/1991 | Fite, Jr. | 370/218 |
| 4,999,829 | 3/1991 | Fite, Jr. et al. | 370/218 |
| 5,003,531 | 3/1991 | Farinholt et al. | 395/182 |
| 5,016,243 | 5/1991 | Fite, Jr. | 370/218 |
| 5,155,845 | 10/1992 | Beal et al. | 395/182 |
| 5,168,443 | 12/1992 | McLaughlin et al. | 395/182 |
| 5,202,887 | 4/1993 | Ueno et al. | 371/10 |
| 5,212,785 | 5/1993 | Powers et al. | 395/575 |
| 5,343,477 | 8/1994 | Yamada | 371/8 |
| 5,485,576 | 1/1996 | Fee et al. | 395/185 |
| 5,487,062 | 1/1996 | Yanagi et al. | 370/16 |
| 5,515,501 | 5/1996 | LaBerge et al. | 395/182 |
| 5,544,330 | 8/1996 | Bither et al. | 395/182 |
| 5,546,535 | 8/1996 | Stallmo et al. | 395/183 |
| 5,548,711 | 8/1996 | Brant et al. | 395/182 |
| 5,554,339 | 9/1996 | Baba | 395/182 |
| 5,596,569 | 1/1997 | Madonna et al. | 370/217 |
| 5,617,425 | 4/1997 | Anderson | 395/182 |
| 5,651,110 | 7/1997 | Powers et al. | 395/182 |
| 5,655,150 | 8/1997 | Matsumoto et al. | 395/182 |
| 5,668,943 | 9/1997 | Attanasio et al. | 395/182 |
| 5,712,968 | 1/1998 | Nakayama et al. | 714/4 |
| 5,922,077 | 7/1999 | Espy et al. | 714/7 |

OTHER PUBLICATIONS

"Fibre Channel: The Digital Highway Made Practical", Tim Sutton, David Webb, Oct. 22, 1994, Seagate Technology Paper. http://www.seagate.com/s . . . r/fibchan/fibchant-p.html.

"Fibre Channel–Arbitrated Loop Active Hub", FCL1063TW, Product Description. http://www.gadzoox-.com/FCL1063.htm.

Meltek FC–Array, Product Description. http://www.meltek-.com/fibre/fca.html.

"Data Storage Just Got 10xFaster—Introducing Box Hill's Fibre Box™", Oct. 1996 Silicon Alley, Product Description. http://www.boxhill.com/fibrebox/press.html.

BEHAVIORAL DIAGRAM

FAIL-OVER SWITCHING SYSTEM

This application is a continuation of U.S. Ser. No. 08/749,311 filed Nov. 14, 1996, now U.S. Pat. No. 5,922,077, the full disclosure of which is hereby incorporated by reference herein.

TECHNICAL FIELD

The present invention relates to having redundant communication pathway loops in a data storage system such that if one communication pathway becomes disabled, communications may be routed over an alternate pathway. In particular, the invention includes a fail-over switch in a system having multiple storage device controllers separately communicating over the redundant loops such that if a loops becomes disabled, the affected data storage device controller may re-route its communications by sharing the alternate loop.

BACKGROUND OF THE INVENTION

The present invention relates to providing access to redundant pathways connected to a plurality of data storage devices. There are many well-known methods in the prior art for effecting such redundant access. For example, a fibre channel arbitrated loop has been designed for use on two communication loops connected to a plurality of data storage devices. Each loop is typically independently controlled, and in systems offering high-availability of the storage devices, the system may compensate for failed components. There are many different solutions in the prior art for allowing such high-availability, but these solutions have focused upon having redundant disks, so that a disk may be hot-swapped if it fails, as well as redundant controller cards, processors, power supplies, fans, etc. that may be hot-swapped with a new unit if the old one fails. These solutions do not address the problem of a communication path that fails, while the controlling hardware remains intact. Such a problem may occur if the physical cable connection is pulled loose, breaking one of the fibre loops in a dual-loop fibre channel system. One conventional solution is to require that a secondary data storage controller handle the input/output processing of data requests through a redundant path to replace the primary controller attached to the now-defunct communication path.

Information relating to the fiber-channel architecture may be found in American National Standards Institute (ANSI) standard X3.232-1994 promulgated by ANSI Committee X3T9.3 on Fibre Channel. This reference is incorporated herein by reference.

SUMMARY OF THE INVENTION

The present invention may be used to provide high-availability to data storage devices. Preferred embodiments of the invention focus on allowing the interconnection of a pair of data storage controllers, each of which is connected to a separate communication path, and in which each path is in communication with an array of data storage devices. The data storage devices each have a communication port for receiving each communication path being utilized by the invention. In this embodiment, if the first fail-over switch is unable to communicate the data request to a storage device over the first communication path, the first fail-over switch may route the data request over the second communication path.

In preferred embodiments, a fail-over switch has several components. There is an incoming data terminal for receiving a data request for transmission to the plurality of storage devices; an outgoing data terminal for receiving a response to the data request; a transmission terminal for communicating, over the first communication path, the data request to the plurality of storage devices; a response terminal for receiving, over the first communication path, data from the plurality of storage devices; a bypass-transmission terminal for communicating, over the second communication path, the data request to the plurality of storage devices; a bypass-response terminal for receiving, over the second communication path, data from the plurality of storage devices; and a switch that individually and selectively connects the first and second communication paths to the other terminals. In preferred embodiments, the switch has a first bypass switch for selectively connecting the incoming data terminal to the transmission terminal or to an intermediate node, and a second bypass switch for selectively connecting the intermediate node to the bypass-transmission terminal or to the outgoing data terminal.

In a particular embodiment, the first and the second communication paths are configured as loops, where the data traveling on the loop is in one direction around the loop. In this embodiment, the first fail-over switch has a transmission and a response terminal, and a bypass-transmission and a bypass-response terminal, so that the first path loop begins and ends with the transmission and response terminals, and the second path loop begins and ends with the bypass-transmission and bypass-response terminals.

In a further embodiment, there are two fail-over switches, each in communication with one of the communication paths, as well as with each other. Preferably each switch has an incoming and outgoing port, and the first and the second communication paths are configured as loops that begin and end with these ports of the first and second fail-over switches. There are also two data storage controllers, one connected to each of the fail-over switches, where all data requests for a particular path would be made through the data storage controller attached to that path. Preferably, communications between the controllers and the switches would be over two serial pathways, where the first serial pathway is connected to an incoming terminal, and the second serial pathway is connected to an outgoing terminal. In this preferred embodiment, the first and second fail-over switches are connected so that a data request may be selectively routed through the first fail-over switch over the first communication path, or through the first and second fail-over switches to the second communication path. In this embodiment, the data storage controllers also function as routers so as to connect the outgoing terminal of the second switch to the incoming terminal of the second switch and loop data received from the first switch back to the second switch's transmission terminal. Similarly, responses to the forwarded request may be routed back to the first switch's outgoing terminal when received from the second communication path.

The two data storage controllers of the system have a direct communication connection between them. If communications along one of the communication paths to the storage devices is disrupted, the data storage device controllers would communicate directly to request permission to share the remaining active communication path. Once authorized, the fail-over switches would be configured to route communications from each of the storage controllers over the active communication path. The present invention advantageously permits both storage controllers to continue operating despite loss of one of the communication paths, thus providing high-availability to the data storage devices without having to utilize complex and costly fibre channel concentrators/hubs.

Other objects and advantages of the invention win become apparent during the following description of the presently preferred embodiments of the invention taken in conjunction with the drawings.

DETAILED DESCRIPTION OF PREFERRED EMBODIMENTS

It is intended that a data storage system will be configured with storage devices, where each storage device is connected to multiple different communication pathways. Data controllers are assigned to specified data storage devices and one of the pathways. The data controller handles data requests and responses respectively to and from the assigned storage devices over that pathway. It is contemplated that the present invention will act as a bridge between the communication pathways such that if one pathway fails, then the affected data controller will be able to route its data requests over another available pathway. Thus the present invention may be used to provide high-availability of a plurality of data storage devices. In preferred embodiments, the storage devices have two communications ports for connection to two pathways. In alternate embodiments, a multiplexing protocol may be used to allow connecting multiple communication paths to a connection port.

Figure 1:
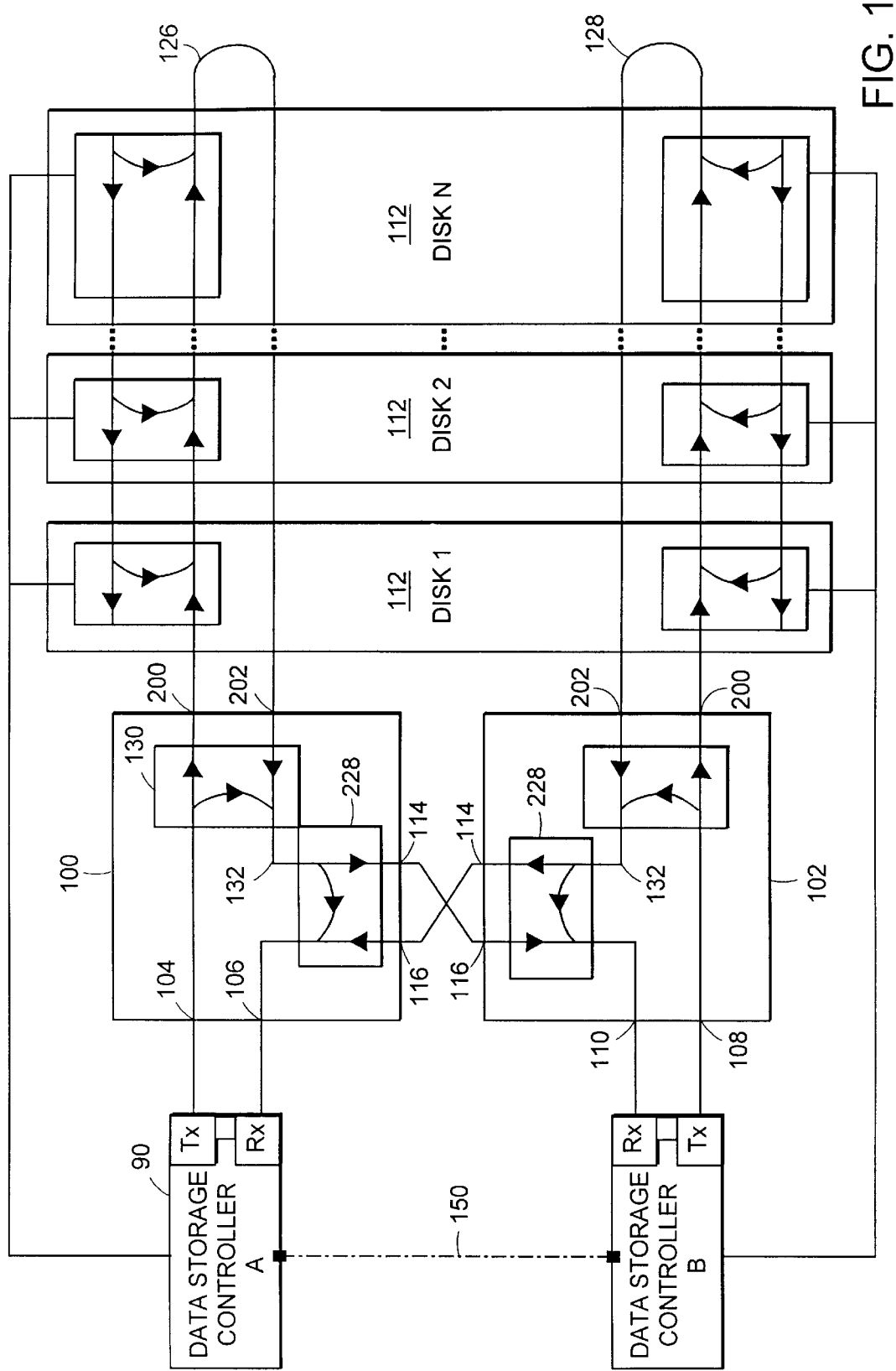
FIG. 1 is a schematic block diagram of a fail-over switching system of the present invention.

FIG. 1 shows a preferred embodiment of the present invention as configured from the interconnection of two fail-over switches 100, 102. In a preferred embodiment, there is a dedicated data storage controller 90, 92 for each fail-over switch, where the dedicated controller processes all data requests intended for the communication path to which the fail-over switch is attached, and where the controller may configure the fail-over switch to utilize its bypass terminals. Data requests for a data storage device 112 can be sent by the first data storage controller 90 to a first incoming terminal 104 on the first fail-over switch 100 for transmission over a first communication path 126. In preferred embodiments, the first communication path is a loop in which data travels serially from point-to-point in a single direction around the loop. Data requests for a different data storage device 112 may be sent by the second data storage controller 92 on a second incoming terminal 108 for transmission over a second communication path 128. In preferred embodiments, the second communication path is also a loop. The first and second communication paths may connect to numerous data storage devices limited by the speed of the path and the desired system speed. With a current Fibre Channel loop over one hundred data storage devices could be connected. Typically, the first data storage controller and the second data storage controller are assigned to different storage devices to avoid arbitration and contention issues.

The data storage controllers 90, 92 receive responses to their requests respectively from the switches' outgoing terminals 106, 110. Each fail-over switch has a transmission terminal 200 and a response terminal 202 for connection to opposite ends of the communication path loop. The fail-over switches may advantageously be switched to provide an alternate connection to an alternate loop. Each of the fail-over switches include a bypass-transmission terminal 114 and a bypass-response terminal 116 for completing the alternate connection. The bypass terminals of the two switches are cross-wired to each other so that the bypass-transmission terminal of one switch is connected to the bypass-response terminal of the other. If communication of the first data storage controller 90 over the first communication path 126 is interrupted, the data storage controllers may communicate with each other through a direct peer-to-peer communication link 150. The second data storage controller connected to an active communication path will diagnostically check the first data storage controller to ascertain whether the problem being experienced is actually the malfunction of the data storage controller rather than of its communication pathway. Only if the data storage controller checks out satisfactorily will the first switch 100 be directed to bypass its ordinarily assigned communication path and to route data requests through the second switch 102. Once communications have been re-routed, then both data storage controllers will be operating over the second communication path 128. The switches can handle the failure of either communication path, switching the data storage controllers both into connection with the remaining active path.

In accordance with the presently preferred embodiment, each fail-over switch includes two port bypass circuits. Under normal circumstances, a first bypass circuit 130 connects the first incoming terminal 104 to the transmission terminal 200. The response terminal 202 is connected to an intermediate node 132. A second bypass circuit 228 connects the intermediate node 132 to the outgoing terminal 106. Thus, communications of the data storage controller 90 take place over the first communication path 126.

When the first communication path 126 is being bypassed, the first port bypass circuit 130 severs the communication link between the first incoming terminal 104 and the transmission terminal 200. The first incoming terminal 104 is connected to the intermediate node 132. The data request received on the incoming terminal 104 is routed through the intermediate node 132 of the switch to the bypass-transmission terminal 114. The bypass-terminal 114 is connected to the second switch's 102 incoming bypass-response terminal 116. The data received upon the bypass-response terminal 116 is transmitted to the outgoing terminal 110 of the second data storage controller, and this data is automatically routed back to the incoming terminal 108 of the second controller. The automatic routing is practiced in the presently preferred embodiment in accordance with the protocol of the Fibre Channel arbitrated loop. Based upon the Fibre Channel protocol, devices connected to the communication pathway arbitrate for the right to transmit over the pathway. The winner of the arbitration may then send out a request to communicate with another device connected to the pathway. The requested device sends an acknowledgment and a point-to-point data path between the two devices is then formed. All other devices on the pathway are required by the Fibre Channel specification to passively forward any data communications not intended for them, in effect, making all connectors to the pathway repeaters for all other connections on the pathway. In this fashion, when the first data storage controller is added to the second communication pathway 128, and the first storage controller has won an arbitration request to communicate with a data storage device, the second data storage controller passively forwards data received on the second switch's 102 outgoing terminal 110 that was not intended for it back to the incoming terminal 108. The forwarded data may then be processed upon the second communication path 128. Similarly, returning data from the second communication path 128 is directed by the second fail-over switch 102 from the response terminal 202 through the intermediate node 132 to the switch's bypass-transmission terminal 114. The bypass-transmission terminal 114 is connected to the bypass-response terminal 116 of the first switch, and the data is made available to the first data storage controller at the outgoing terminal 106.

Figure 2:
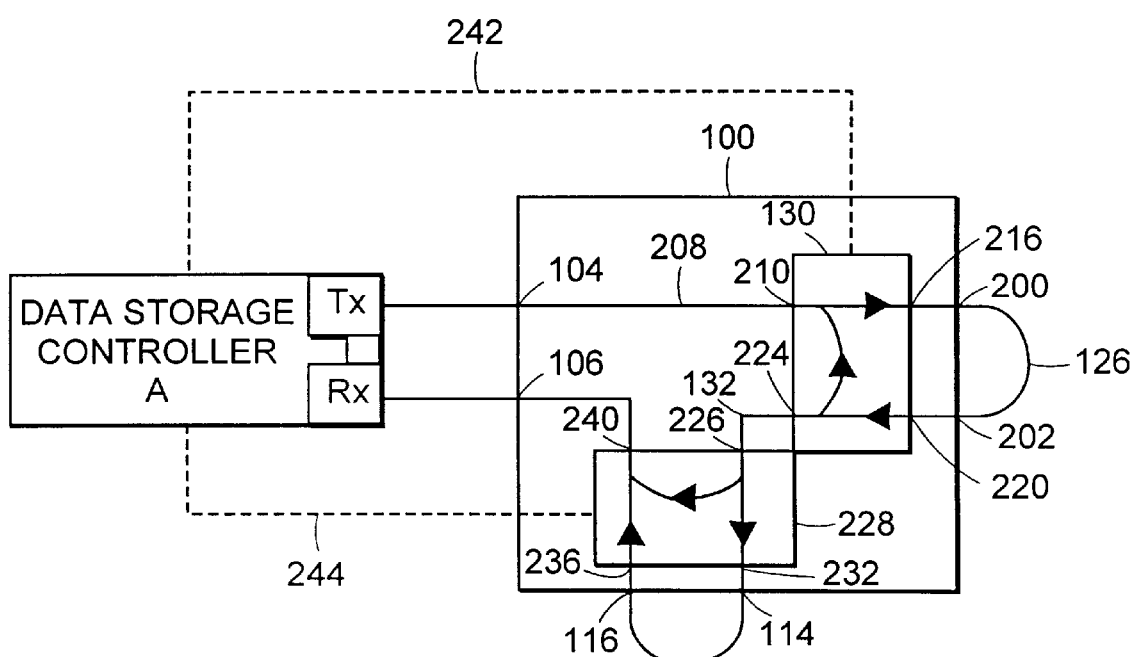
FIG. 2 is a schematic block diagram of a fail-over switching system of the present invention for use with a single data storage controller.

FIG. 2 shows the first fail-over switching system with only one data storage controller 90. The fail-over switch 100 puts the data storage controller 90 in communication with the first communication path 126 or the second communication path 128. The second communication path 128 must be routed through a second fail-over switch 102 or directly connected to the second path 128.

Data is transmitted by the first fail-over switch 100 to the first communication path from a transmission terminal 200. Data is received from the loop over response terminal 202. When the fail-over switch is in its normal state, received data is directed through the intermediate node 132 across the second port bypass circuit 228 to the outgoing terminal 106. When the fail-over switch is switched, the first port bypass circuit 130 connects the incoming terminal 104 to the intermediate node 132. Data is transmitted to the second communication path 128 from bypass-transmission terminal 114. Data is received over bypass-response terminal 116. Thus, the fail-over switch permits communications by the data storage controller to proceed over either of the first communications loop 126 or the second communication loop 128. Thus, a problem on either loop can be accommodated by switching onto the other loop.

Referring in greater detail to FIG. 2, the incoming terminal 104 is connected to a data-in port 210 of the first port bypass circuit 130. A data-out port 216 of the first port bypass circuit 130 is connected to the transmission terminal 200. The response terminal 202 is connected to a response-in port 220 of the first port bypass circuit. A response-out port 224 of the first port bypass circuit is connected to a data-in port 226 of the second port bypass circuit 228. The term intermediate node 132 as used herein refers to the connection between the two port bypass circuits 130, 228. The bypass-transmission terminal 114 is connected to a data-out port 232. The bypass-response terminal 116 is connected to the response-in port 236. A response-out port 240 is connected to the outgoing terminal 106 of the first fail-over switch 100. The state of the port bypass circuits is controlled by the data storage controller 90. Although there need not be a direct connection to accomplish the control, lines 242 and 244 are shown to represent the control by the data storage controller 90 over the fail-over switches. Various intermediate controllers may be used to carry out the instructions from the data storage controllers in alternate embodiments.

When a fail-over switch is in a switched bypass mode, communication through the incoming 104 and outgoing 106 terminals is routed through the bypass-transmission 114 and bypass-response 116 terminals instead of through the transmission 200 and response 202 terminals. As indicated hereinabove, in preferred embodiments, the transmission 200 and response 202 terminals would be in direct communication with the first communication path 126, while the bypass-transmission 204 and bypass-response 206 terminals may require communications to be routed through other hardware (e.g. the second fail-over switch 102 of FIG. 1) to reach the second communication path 128.

Figure 3B:
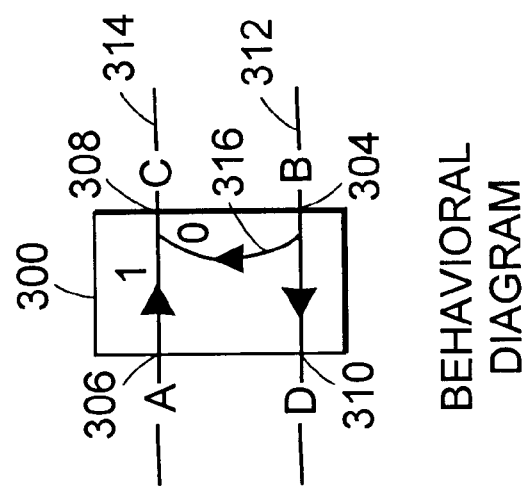
FIGS. 3a and 3b are schematic diagrams showing the circuitry and behavior respectively of a prior art port bypass circuit.
Figure 3A:
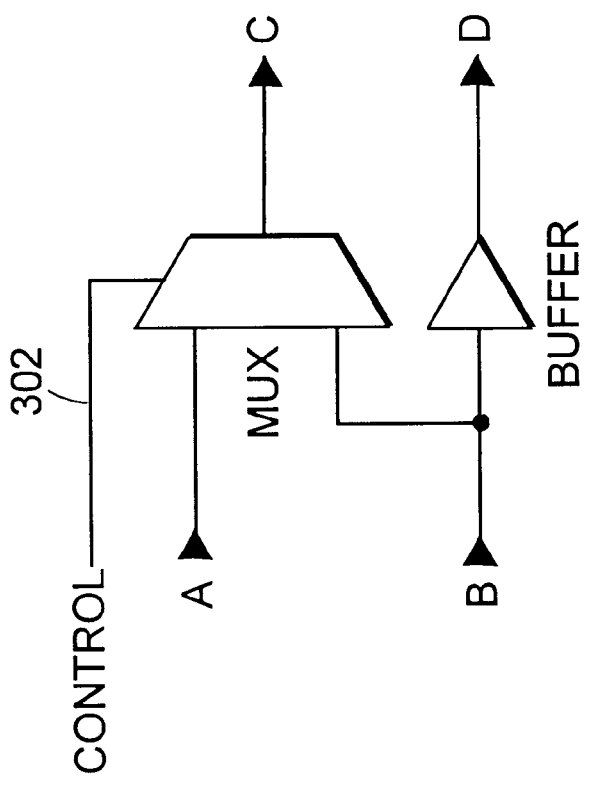

FIG. 3a shows a logical circuit diagram of a prior-art port bypass circuit 300. FIG. 3b shows a behavioral diagram of such a port bypass circuit. These port bypass circuits may be used to make the fail-over switches used in the present invention. A port bypass circuit has two modes of operation, the first being a pass-through mode, and the second being a bypass-mode. The mode is controlled by the status of a control line 302 shown in FIG. 3a. If the control line indicates the pass-through mode, then data on a data transmission line 312 connected to the switch's data-in port 304 passes through the switch to exit on the switch's data-out port 310. In pass-through mode, response data is received on the switch's response-in port 306, and this data passes through the switch to a data response line 314 that is connected to the switch's response out port 308. When the control 302 indicates the bypass-mode, then data entering the switch's data-in port 304 is routed directly to the switch's response-out port 308, thus bypassing the data-out 310 port.

Though the embodiments hereinbefore described are preferred, many modifications and refinements which do not depart from the true spirit and scope of the invention may be conceived by those skilled in the art. It is intended that all such modifications, including but not limited to those set forth above, be covered by the following claims.

What is claimed is:

1. A method for recovering from a malfunctioning communication path comprising the steps of:
   providing a first data storage controller connected to a plurality of data storage devices over a first communication path and a second data storage controller connected to the plurality of data storage devices over a second communication path;
   detecting a malfunction over the first communication path;
   requesting access to the second communication path; and
   switching the first data storage controller into connection with the plurality of storage devices over the second communication path such that the first and second data storage controllers share use of the second communication path.

2. The method of claim 1 wherein said step of requesting access comprises communicating between the first data storage controller and the second data storage controller over a direct peer-to-peer communication link.

3. The method of claim 2 further comprising a step of receiving approval on the peer-to-peer communication link to connect to the second communication path.

4. The method of claim 1 wherein the first and second communication paths are each serial communication loops and wherein said step of switching comprises uncoupling the first data storage controller from two ends of the first communication path and coupling the first data storage controller with the second communication path through two terminals of a switch in the second data storage controller.

5. A method for recovering from a malfunctioning communication path comprising the steps of:
   providing a first data storage controller having communication access to a plurality of data storage devices over a first communication path and a second data storage controller having communication access to the plurality of data storage devices over a second communication path;
   detecting a malfunction over the first communication path;

requesting access to the second communication path; and switching the first data storage controller into communication access with the plurality of storage devices over the second communication path to form a serial communication loop that includes the first data storage controller, the second data storage controller and the second communication path wherein communication messages on the serial communication loop reaching one of the data storage controllers but not intended for the one of the data storage controllers is forwarded along the serial communication loop.

6. The method of claim 5 wherein said step of requesting access comprises communicating between the first data storage controller and the second data storage controller over a direct peer-to-peer communication link.

7. The method of claim 6 further comprising a step of receiving approval on the peer-to-peer communication link to access the second communication path.

8. The method of claim 5 wherein the first and second communication paths are each serial communication loops and wherein said step of switching comprises uncoupling the first data storage controller from two ends of the first communication path and coupling the first data storage controller with the second communication path through two terminals of a switch in the second data storage controller.

* * * * *